(12) United States Patent
Saito et al.

(10) Patent No.: US 11,394,045 B2
(45) Date of Patent: Jul. 19, 2022

(54) ELECTROLYTE MATERIAL, LIQUID COMPOSITION COMPRISING IT AND ITS USE

(71) Applicant: AGC Inc., Chiyoda-ku (JP)

(72) Inventors: Susumu Saito, Chiyoda-ku (JP); Satoru Hommura, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 40 days.

(21) Appl. No.: 16/238,595

(22) Filed: Jan. 3, 2019

(65) Prior Publication Data

US 2019/0140299 A1 May 9, 2019

Related U.S. Application Data

(63) Continuation of application No. PCT/JP2017/024690, filed on Jul. 5, 2017.

(30) Foreign Application Priority Data

Jul. 11, 2016 (JP) .............................. JP2016-137026

(51) Int. Cl.
*H01M 8/1039* (2016.01)
*H01M 8/1004* (2016.01)
(Continued)

(52) U.S. Cl.
CPC ......... *H01M 8/1039* (2013.01); *C08F 214/18* (2013.01); *C08F 214/24* (2013.01);
(Continued)

(58) Field of Classification Search
CPC .... H01M 8/1004–1039; C08F 214/242; C08F 214/262; C08F 2800/20
See application file for complete search history.

(56) References Cited

U.S. PATENT DOCUMENTS

2008/0138685 A1 6/2008 Kaneko et al.
2008/0146841 A1 6/2008 Kaneko et al.
(Continued)

FOREIGN PATENT DOCUMENTS

CN 101228655 A 7/2008
CN 103782433 A 5/2014
(Continued)

OTHER PUBLICATIONS

International Search Report dated Sep. 19, 2017 in PCT/JP2017/024690, filed on Jul. 5, 2017 (with English Translation).

*Primary Examiner* — Osei K Amponsah
(74) *Attorney, Agent, or Firm* — Element IP, PLC

(57) ABSTRACT

To provide an electrolyte material having a low hydrogen gas permeability and excellent hot water resistance.
An electrolyte material comprising a polymer having units represented by the following formula u1 and units based on chlorotrifluoroethylene at the specific proportion:

$$\begin{array}{c}\text{---}(\text{CF}_2\text{---CF})\text{---}\\|\\(\text{CF}_2)_s\text{OCF}_2\text{---CY}^1\end{array}\begin{array}{c}Q^{11}\text{---SO}_2X^1(\text{SO}_2R^{f1})_a^-Z^+\\ \\Q^{12}\text{---SO}_2X^1(\text{SO}_2R^{f1})_a^-Z^+\end{array}\quad(\text{u1})$$

wherein $Q^{11}$ is a perfluoroalkylene group which may have an etheric oxygen atom, $Q^{12}$ is a single bond or a perfluoroalkylene group which may have an etheric oxygen atom, $Y^1$ is a fluorine atom or the like, s is 0 or 1, $R^{f1}$ is a perfluoroalkyl group which may have an etheric oxygen atom, $X^1$ is an oxygen atom or the like, a is 0 when $X^1$ is an oxygen, and $Z^+$ is $H^+$ or the like.

11 Claims, 1 Drawing Sheet

(51) Int. Cl.
  *C08F 214/18*  (2006.01)
  *H01B 1/12*   (2006.01)
  *H01B 1/10*   (2006.01)
  *H01B 1/06*   (2006.01)
  *C08F 214/24* (2006.01)
  *H01M 8/1023* (2016.01)
  *C08F 214/26* (2006.01)
  *H01M 8/10*   (2016.01)

(52) U.S. Cl.
  CPC ...... *C08F 214/242* (2013.01); *C08F 214/262* (2013.01); *H01B 1/06* (2013.01); *H01B 1/10* (2013.01); *H01B 1/12* (2013.01); *H01M 8/1004* (2013.01); *H01M 8/1023* (2013.01); *C08F 2800/20* (2013.01); *H01M 2008/1095* (2013.01); *H01M 2300/0082* (2013.01); *Y02E 60/50* (2013.01)

(56) References Cited

U.S. PATENT DOCUMENTS

2011/0053042 A1*  3/2011  Yamada ............. C08G 18/6279
                                              429/492
2013/0052561 A1   2/2013  Hommura et al.
2015/0030962 A1*  1/2015  Hommura ........... H01M 8/1004
                                              429/483

FOREIGN PATENT DOCUMENTS

| JP | 2014-502300 | 1/2014 |
| JP | 5989658 | 9/2016 |
| WO | WO 2007/013533 A1 | 2/2007 |
| WO | WO 2012/069360 A2 | 5/2012 |

\* cited by examiner

ELECTROLYTE MATERIAL, LIQUID COMPOSITION COMPRISING IT AND ITS USE

TECHNICAL FIELD

The present invention relates to an electrolyte material, a liquid composition comprising the electrolyte material, a polymer electrolyte membrane comprising the electrolyte material, a membrane/electrode assembly comprising the polymer electrolyte membrane, a polymer electrolyte fuel cell comprising the membrane/electrode assembly and a precursor for the electrolyte material.

BACKGROUND ART

A polymer electrolyte fuel cells is, for example, has a structure of a stack of a plurality of cells, each comprising a membrane/electrode assembly sandwiched between two separators. The membrane/electrode assembly comprises an anode and a cathode each having a catalyst layer, and a polymer electrolyte membrane disposed between the anode and the cathode. The polymer electrolyte membrane is one having an electrolyte membrane formed of a fluorinated polymer having ion exchange groups formed into a membrane-shape.

The reactions in the polymer electrolyte fuel cell are represented by the following formulae.

Anode:$H_2 \rightarrow 2H^+ + 2e^-$

Cathode:$2H^+ + \frac{1}{2}O_2 + 2e^- \rightarrow H_2O$

Accordingly, the polymer electrolyte fuel cell is required to conduct protons without letting hydrogen gas penetrate.

As a fluoropolymer having ion exchange groups and having a low hydrogen gas permeability, Patent Document 1 proposes a fluorinated ion exchange polymer comprising units based on $CF_2=CCIY$ (wherein Y is a fluorine atom or a chlorine atom) and units based on $CF_2=CF-O(CF_2CF(CF_3)O)_m-(CF_2)_nSO_2X$ (wherein m is 0 or 1, n is an integer of from 0 to 10, x is a halogen atom or $-O^-M^+$, and $M^+$ is $H^+$, $NH_4^+$, $K^+$, $Li^+$ or $Na^+$).

PRIOR ART DOCUMENTS

Patent Documents

Patent Document 1: WO2012/069360

DISCLOSURE OF INVENTION

Technical Problem

However, chlorotrifluoroethylene which is $CF_2=CCIY$ has a chain transferring property, and thereby it is difficult to make the molecular weight of a fluoropolymer having units based on chlorotrifluoroethylene high.

When electricity is generated in a polymer electrolyte fuel cell, a polymer electrolyte membrane is exposed to high temperature and high humidity conditions. Thus, the polymer electrolyte membrane is required to have the hot water resistance. However, a fluoropolymer having units based on chlorotrifluoroethylene has a low molecular weight, and thereby the hot water resistance is insufficient.

The present invention provides an electrolyte material having a low hydrogen gas permeability and an excellent hot water resistance; a liquid composition, whereby a membrane having low hydrogen gas permeability and an excellent hot water resistance can be formed; a polymer electrolyte membrane having a low hydrogen gas permeability and an excellent hot water resistance; a membrane/electrode assembly and a polymer electrolyte fuel cell which have a polymer electrolyte membrane having a low gas permeability and an excellent hot water resistance; and a precursor, whereby an electrolyte material having a low hydrogen gas permeability and an excellent hot water resistance can be obtained.

Solution to Problem

The present invention provides the following embodiments.

<1> An electrolyte material comprising a polymer H having units represented by the following formula (u1) and units based on chlorotrifluoroethylene, wherein the proportion of the units represented by the formula u1 is from 10 to 25 mol % per all units contained in the polymer H, and the proportion of the units based on chlorotrifluoroethylene is from 5 to 90 mol % per all units contained in the polymer H:

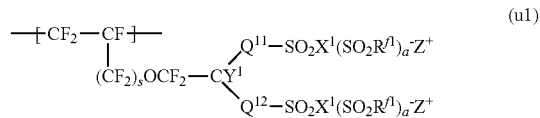

wherein $Q^{11}$ is a perfluoroalkylene group which may have an etheric oxygen atom, $Q^{12}$ is a single bond or a perfluoroalkylene group which may have an etheric oxygen atom, $Y^1$ is a fluorine atom or a monovalent perfluoroorganic group, s is 0 or 1, $R^{f1}$ is a perfluoroalkyl group which may have an etheric oxygen atom, $X^1$ is an oxygen atom, a nitrogen atom or a carbon atom, a is 0 when $X^1$ is an oxygen atom, a is 1 when $X^1$ is a nitrogen atom, a is 2 when $X^1$ is a carbon atom, and $Z^+$ is $H^+$, a monovalent metal ion or an ammonium ion of which at least one hydrogen atom may be substituted with a hydrocarbon group.

<2> The electrolyte material according to the above (1), wherein the polymer H has at most 800 g/equivalent of EW represented by the following formula:

$$EW = 1000/AR \qquad (I)$$

wherein EW is equivalent mass which represents the mass of a polymer per one equivalent amount of an ion exchange group, and AR is ion exchange capacity which represents milliequivalent amount of ion exchange groups per 1 g of the polymer.

<3> The electrolyte material according to the above <1> or <2>, wherein the polymer H further has units based on tetrafluoroethylene.

<4> The electrolyte material according to any one of the above <1> to <3>, wherein the polymer H comprises the units represented by the formula (u1)/the units based on chlorotrifluoroethylene/the units based on tetrafluoroethylene at the proportion of 10 to 25 mol %/5 to 90 mol %/0 to 85 mol %, per all units contained in the polymer H.

<5> The electrolyte material according to any one of the above <1> to <4>, wherein the units represented by the formula u1 is units represented by the following formula u1-1, the formula u1-2 or u1-3.

<6> The electrolyte material according to any one of the above <1> to <4>, wherein the polymer H further has units represented by the following formula u2.

<7> The electrolyte material according to any one of the above <1> to <6>, wherein the mass reduction rate when dipped in hot water at 120° C. for 24 hours is at most 15 mass %.

<8> The electrolyte material according to any one of the above <1> to <7>, wherein the hydrogen gas permeability coefficient at a temperature of 80° C. under a relative humidity of 10% is at most $6.7 \times 10^{-10}$ m$^3$·m/(m$^2$·s·Pa).

<9> A liquid composition comprising a dispersion medium and the electrolyte material as defined in any one of the above <1> to <8>.

<10> The liquid composition according to the above <9>, wherein the dispersion medium is an organic solvent having a hydroxy group and containing water.

<11> A polymer electrolyte membrane comprising the electrolyte material as defined in any one of the above <1> to <8>.

<12> A membrane/electrode assembly comprising an anode having a catalyst layer, a cathode having a catalyst layer and the polymer electrolyte membrane as defined in the above <11> which is disposed between the anode and the cathode.

<13> A polymer electrolyte fuel cell comprising the membrane/electrode assembly as defined in the above <12>.

<14> A precursor for the electrolyte material as defined in any one of the above <1> to <8>, which comprises a polymer F having units represented by the following formula u'1 and units based on chlorotrifluoroethylene.

<15> The precursor according to the above <14>, wherein the polymer F has the following TQ of from 220 to 280° C.:

TQ: temperature when the polymer F is melted and extruded under a pressure of 2.94 MPa, the extrusion amount from a nozzle having a length of 1 mm and an inner diameter of 1 mm becomes 100 mm$^3$/sec.

Advantageous Effects of Invention

The electrolyte material of the present invention has a low hydrogen gas permeability and is excellent in the hot water resistance.

According to the liquid composition of the present invention, a membrane having a low hydrogen gas permeability and an excellent hot water resistance can be formed. The polymer electrolyte membrane of the present invention has a low hydrogen gas permeability and an excellent hot water resistance. The membrane/electrode assembly of the present invention has a polymer electrolyte membrane having a low hydrogen gas permeability and an excellent hot water resistance. The polymer electrolyte fuel cell of the present invention has a polymer electrolyte membrane having a low hydrogen gas permeability and an excellent hot water resistance.

According to the precursor of the present invention, an electrolyte material having a low hydrogen gas permeability and an excellent hot water resistance can be obtained.

DESCRIPTION OF EMBODIMENTS

Figure 1:
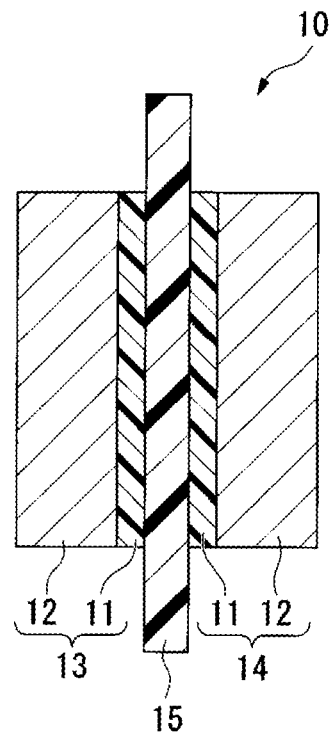
FIG. 1 is a cross-section illustrating an example of a membrane/electrode assembly of the present invention.

The terms in this specification have the following meanings.

"Units" in a polymer means polymerized units formed by polymerizing monomers and derived from the monomers or polymerized units wherein a part of the polymerized units is converted to another structure by treating a polymer.

An "ion exchange group" means a group of which a part of cations contained in the group may be exchanged for other cations and may, for example, be a sulfonic acid group, a sulfonimide group or a sulfonmethide group.

A "sulfonic acid group" means —SO$_3^-$H$^+$ or —SO$_3$M$^+$ (wherein M$^+$ is a monovalent metal ion, or an ammonium ion in which at least on hydrogen atom may be substituted with a hydrocarbon group).

The expression "to" showing the numerical range is used to include the numerical values before and after thereof as the lower limit value and the upper limit value.

"Hydrogen gas permeability coefficient" means a hydrogen gas permeability coefficient measured in accordance with JIS K7126-2: 2006 "plastic-film and sheet-gas permeability test method-part 2: equal pressure method" (corresponding international standard: ISO 15105-2: 2003) mentioned in "annex B (normative) test method by gas chromatography".

In this specification, "units" represented by the formula u1 will be referred to as "units u1". The same applies to units represented by other formulae.

In this specification, a compound represented by the formula m1 will be referred to as "compound m1". The same applies to compounds represented by other formulae.

<Electrolyte Material>

The electrolyte material of the present invention is formed from a polymer H having units u1 and units based on chlorotrifluoroethylene (hereinafter referred to also as "CTFE units").

The polymer H has units u1 and CTFE units.

The polymer H preferably further has units (hereinafter referred to also as "TFE units") based on tetrafluoroethylene (hereinafter referred to also as "TFE"), since the mechanical properties and the chemical durability of the polymer H will be excellent.

As the case required, the polymer H may have units u2. Further, as the case requires, the polymer H may further have units (hereinafter referred to also as "other units") other than the units u1, the CTFE units, the TFE units and the units u2.

The unit u1 is represented by the following formula.

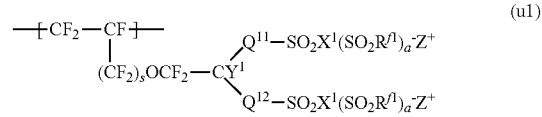

wherein Q$^{11}$ is a perfluoroalkylene group which may have an etheric oxygen atom, Q$^{12}$ is a single bond or a perfluoroalkylene group which may have an etheric oxygen atom, Y$^1$ is a fluorine atom or a monovalent perfluoroorganic group, s is 0 or 1, R$^{f1}$ is a perfluoroalkyl group which may have an etheric oxygen atom, X$^1$ is an oxygen atom, a nitrogen atom or a carbon atom, a is 0 when X$^1$ is an oxygen atom, a is 1 when X$^1$ is a nitrogen atom, a is 2 when X$^1$ is a carbon atom, and Z$^+$ is H$^+$, a monovalent metal ion or an ammonium ion in which at least one hydrogen atom may be substituted with a hydrocarbon group. The single bond means direct binding of the carbon atom of CY$^1$ and the sulfur atom of SO$_2$. The organic group means a group having at least one carbon atom.

When the perfluoroalkylene group for $Q^{11}$ or $Q^{12}$ has an etheric oxygen atom, the number of such oxygen atom may be one or may be two or more. Further, such oxygen atom may be present between carbon atoms in the perfluoroalkylene group, or may be present at the $CY^1$ side terminal of the perfluoroalkylene group.

The perfluoroalkylene group may be linear or branched and is preferably linear.

The number of carbon atoms in the perfluoroalkylene group is preferably from 1 to 6, more preferably from 1 to 4. When the number of carbon atoms is at most 6, the boiling point of the monomer as the raw material will be low, whereby purification by distillation becomes easy. Further, when the number of carbon atoms is at most 6, it is possible to prevent a decrease in the ion exchange capacity of the polymer H, and to prevent a decrease in the proton conductivity.

$Q^{12}$ is preferably a $C_{1-6}$ perfluoroalkylene group which may have an etheric oxygen atom. When $Q^{12}$ is a $C_{1-6}$ perfluoroalkylene group which may have an etheric oxygen atom, the stability of the power generation performance will be excellent when a polymer electrolyte fuel cell is operated over a long period of time, as compared with a case where $Q^{12}$ is a single bond.

At least one of $Q^{11}$ and $Q^{12}$ is preferably a $C_{1-6}$ perfluoroalkylene group having an etheric oxygen atom. A monomer having such a $C_{1-6}$ perfluoroalkylene group having an etheric oxygen atom, can be prepared without via a fluorination reaction with fluorine gas, whereby the yield is good, and the production is easy.

The perfluoroalkyl group for $R^{f1}$ may be linear or branched and is preferably linear.

The perfluoroalkyl group has preferably from 1 to 6, more preferably from 1 to 4 carbon atoms. The perfluoroalkyl group is preferably a perfluoromethyl group, a perfluoroethyl group or the like.

In a case where the unit u1 has at least two $R^{f1}$, each $R^{f1}$ may be the same group or a different group.

As $—SO_2X^1(SO_2R^{f1})_a^-Z^+$, $—SO_3^-Z^+$, $—SO_2N(SO_2R^{f1})^-Z^+$ or $—SO_2C(SO_2R^{f1})_2^-Z^+$ may be mentioned.

$Y^1$ is preferably a fluorine atom or a linear $C_{1-6}$ perfluoroalkyl group which may have an etheric oxygen atom.

As the unit u1, the following unit u1-1 to unit u1-3 are preferred, since the production of the polymer H is easy, and industrial application is easy. The unit u1-2 or the unit u1-3 is preferred, since the polymer H to be obtained is flexible, is not likely to be broken, when a polymer electrolyte membrane is formed from the polymer H, and swelling under a wet condition and shrinkage under a dry condition are repeated.

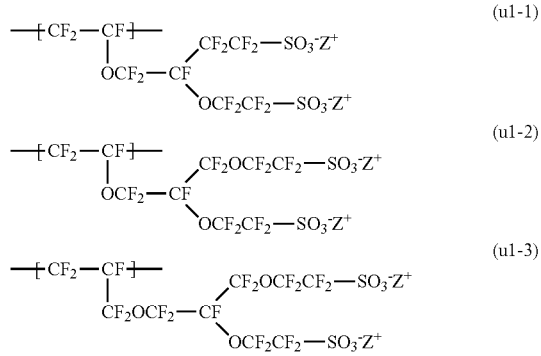

The above mentioned unit u2 is represented by the following formula.

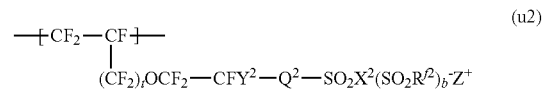

wherein $Q^2$ is a single bond or a perfluoroalkylene group which may have an etheric oxygen atom, $Y^2$ is a fluorine atom or a monovalent perfluoroorganic group, t is 0 or 1, $R^{f2}$ is a perfluoroalkyl group which may have an etheric oxygen atom, $X^2$ is an oxygen atom, a nitrogen atom or a carbon atom, b is 0 when $X^2$ is an oxygen atom, b is 1 when $X^2$ is a nitrogen atom, b is 2 when $X^2$ is a carbon atom, and $Z^+$ is $H^+$, a monovalent metal ion or an ammonium ion in which at least one hydrogen atom may be substituted with a hydrocarbon group. The single bond means direct binding of the carbon atom of $CFY^2$ and the sulfur atom of $SO_2$. The organic group means a group having at least one carbon atom.

When the perfluoroalkylene group for $Q^2$ has an etheric oxygen atom, the number of such oxygen atom may be one or may be two or more. Further, such oxygen atom may be present between carbon atoms in the perfluoroalkylene group, or may be present at the $CFY^2$ side terminal of the perfluoroalkylene group.

The perfluoroalkylene group may be linear or branched.

The number of carbon atoms in the perfluoroalkylene group is preferably from 1 to 6, more preferably from 1 to 4. When the number of carbon atoms is at most 6, the deterioration of the ion exchange capacity of the polymer H can be suppressed, and the deterioration of the proton conductivity can be suppressed.

The perfluoroalkyl group for $R^{f2}$ may be linear or branched and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

As $—SO_2X^2(SO_2R^{f2})_b^-Z^+$, $—SO_3^-Z^+$, $—SO_2N(SO_2R^{f2})^-Z^+$ or $—SO_2C(SO_2R^{f2})_2^-Z^+$ may be mentioned.

$Y^2$ is preferably a fluorine atom or a trifluoromethyl group.

The unit u2 is preferably the unit u2-1 to u2-4, since the production of the polymer H is easy, and the industrial application is easy.

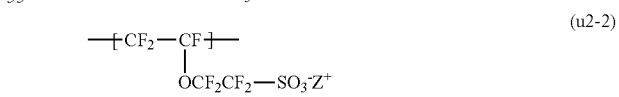

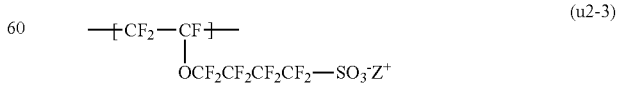

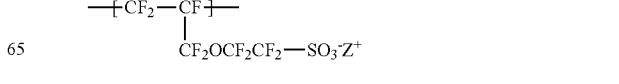

Other units are units based on monomers (hereinafter referred to also as "other monomers") other than the units u1, the CTFE units, the TFE units and the units u2.

Such other monomers may, for example, be trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), perfluorovinyl ether (perfluoro(alkyl vinyl ether), a perfluoro(etheric oxygen atom-containing alkyl vinyl ether), etc.) and perfluoromonomers having a 5 membered ring, etc. mentioned in WO2011/013578.

The polymer H may have one type of units u1, units u2 and other units respectively or may have two or more types of them respectively.

The proportion of each units may be adjusted depending on EW (equivalent weight), the proton conductivity, the hydrogen gas permeability, the hot water resistance, the mechanical properties, etc. required for the electrolyte material.

The proportion of the units u1 is from 10 to 25 mol %, preferably from 12 to 25 mol %, more preferably from 15 to 24 mol %, further preferably from 16 to 22 mol %, per all units contained in the polymer H. When the proportion of the units u1 is at least the lower limit value of the above range, the proton conductivity and the hot water resistance of the electrolyte material tend to be excellent. When the proportion of the units u1 is at most the upper limit value of the above range, effects by the units other than the units u1 will hardly be impaired.

The proportion of the CTFE units is from 5 to 90 mol %, preferably from 6 to 80 mol %, more preferably from 7 to 71 mol %, further preferably from 8 to 66 mol % per all units contained in the polymer H. When the proportion of the CTFE units is at least the lower limit value of the above, the hydrogen gas permeability of the electrolyte material tend to be excellent. When the proportion of the CTFE units is at most the upper limit value of the above range, effects by the units other than the CTFE units will hardly be impaired.

The proportion of the TFE units is preferably from 0 to 85 mol %, more preferably from 8 to 82 mol %, further preferably from 15 to 78 mol %, particularly preferably from 18 to 76 mol %, per all units contained in the polymer H. When the TFE units are contained, the mechanical properties of the electrolyte material tend to be further excellent. When the proportion of the TFE units is at most the upper limit value of the above range, effects by the units other than the TEE units will hardly be impaired.

The total proportion of the units u2 and other units is preferably from 0 to 20 mol %, more preferably from 0 to 15 mol %, further preferably from 0 to 10 mol %, particularly preferably from 0 to 5 mol % per all units contained in the polymer H. When the total proportion of the units u2 and other units is at most the upper limit value of the above range, effects by the units u1, the CTFE units and the TFE units will hardly be impaired.

The polymer H preferably contains the units u1/CTFE units/TFE units of 10 to 25 mol %/5 to 90 mol %/0 to 85 mol %, more preferably 12 to 25 mol %/6 to 80 mol %/8 to 82 mol %, further preferably 15 to 24 mol %/7 to 71 mol %/15 to 78 mol %, particularly preferably 16 to 22 mol %/8 to 66 mol %/18 to 76 mol %, per all units contained in the polymer H.

EW of the polymer H of the present invention is a value calculated by the following formula (I) and is preferably at most 800 g/eq, more preferably from 300 to 750 g/eq, further preferably from 400 to 650 g/eq.

$$EW = 1000/AR \tag{I}$$

wherein EW is equivalent weight representing the mass of a polymer per 1 equivalent weight of ion exchange groups, and AR is an ion exchange capacity representing milliequivalent of the ion exchange groups per the mass 1 g of the polymer.

When EW of the polymer H is at most the upper limit value of the above range, the proton conductivity and the hot water resistance of the electrolyte material are more excellent. When EW is at least the lower limit value of the above range, the polymer H having a high molecular weight can be easily prepared, and the polymer H will not excessively swell with water, whereby the electrolyte material are further excellent in the mechanical properties.

The electrolyte material of the present invention tends to be excellent in the hot water resistance. As mentioned below, the hot water resistance is represented by a mass reduction ratio, when the electrolyte material of the present invention is dipped in hot water of 120° C. for 24 hours. The mass reduction ratio is preferably at most 15 mass %, more preferably at most 12 mass %, further preferably at most 10 mass %. When the mass reduction ratio is at most the upper limit value of the above range, the electrolyte material is further excellent in the hot water resistance. The lower the mass reduction ratio is, the more the hot water resistance is improved, and the lower limit is 0 mass %.

The polymer electrolyte material of the present invention preferably has a hydrogen gas permeability coefficient at a temperature of 80° C. under a relative humidity of 10% of at most $6.7 \times 10^{-10}$ m³·m/(m²·s·Pa), more preferably at most $6.5 \times 10^{-10}$ m³·m/(m²·s·Pa), further preferably at most $6.3 \times 10^{-10}$ m³·m/(m²·s·Pa). The lower the hydrogen gas permeability coefficient is, it is more preferred, and the lower limit is 0 m³·m/(m²·s·Pa).

The polymer H which is the electrolyte material is produced by converting —SO$_2$F groups in a polymer F which is a precursor of the electrolyte material into ion exchange groups.

The polymer F has units u'1 and CTFE units.

The polymer F preferably further has TFE units, whereby the polymer H will be excellent in the mechanical properties and the chemical durability.

As a case requires, the polymer F may further have units u'2. Further, as a case requires, the polymer F may have units other than the units u'1, the CTFE units, the TFE units and the units u'2.

The unit u'1 is represented by the following formula.

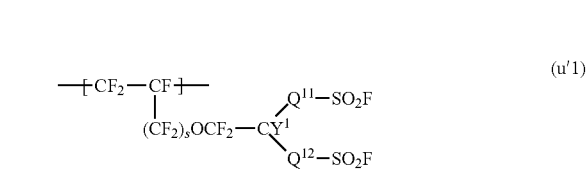

$Q^{11}$, $Q^{12}$, $Y^1$ and s are the same as $Q^{11}$, $Q^{12}$, $Y^1$ and s in the unit u1, and preferred embodiments are also the same.

The unit u'1 is preferably the unit u'1-1 to unit u'1-3, since the production of the polymer F is easy, and industrial application is easy. The unit u'1-2 or the unit u'1-3 is more preferred, since the polymer F to be obtained is flexible, and when formed into the polymer H and further into a polymer electrolyte membrane, the membrane is less likely to be broken even when repeatedly subjected to swelling in a wet state and shrinkage in a dry state.

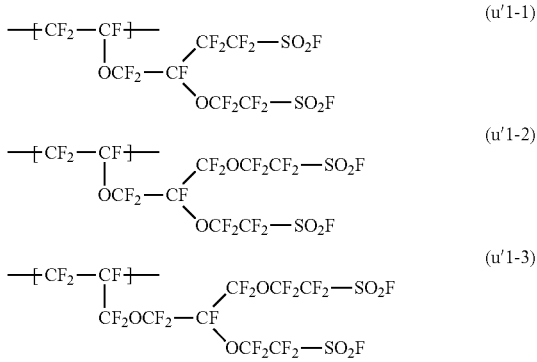

The unit u'2 is represented by the following formula.

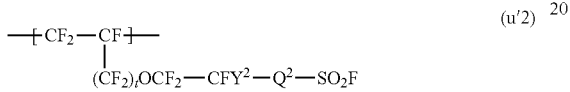

$Q^2$, $Y^2$ and t are the same as $Q^2$, $Y^2$ and t in the unit u2, and preferred embodiments are also the same.

As the unit u'2, the unit u'2-1 to u'2-4 are preferred, since the production of the polymer F is easy, and industrial application is easy.

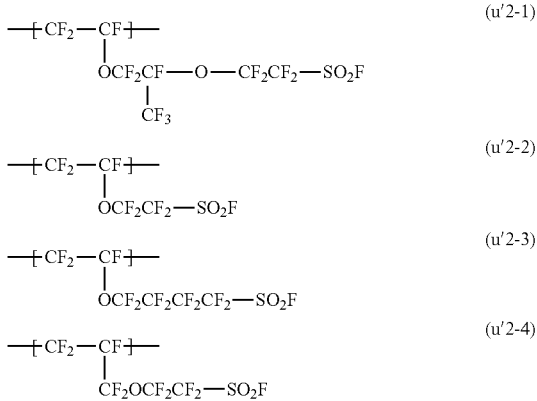

Other units are units based on monomers other than the units u'1, the CTFE units, the TFE units and the units u'2.

The polymer F may have one type of the units u'1, the units u'2 and other units respectively or may have two or more types of them respectively.

The proportions of the respective units may be appropriately adjusted depending upon EW, the proton conductivity, the hydrogen permeability, the hot water resistance, the mechanical properties, etc. required for the electrolyte material.

The preferred proportions of the respective units are the same as the preferred proportion of the respective units in the polymer H.

TQ of the polymer F is preferably from 220 to 280° C., more preferably from 230 to 280° C., further preferably from 240 to 280° C. When TQ of the polymer F is at least the above lower limit value, the polymer H has a sufficient molecular weight, and the electrolyte material is further excellent in the hot water resistance and the mechanical properties. When TQ of the polymer F is at most the above upper limit value, the polymer H has a good solubility or dispersibility, and the after-mentioned liquid composition can be easily prepared.

TQ is an index of the molecular weight and the softening point of the polymer. TQ is temperature at which the extrusion amount becomes 100 mm³/sec, when the polymer F is melted and extruded from a nozzle having a length of 1 mm and an inner diameter of 1 mm, under 2.94 MPa.

The polymer F which is a precursor of the electrolyte material is prepared by polymerizing the compound m1 and CTFE and as a case requires, TFE, the compound m2 and other monomers.

The compound m1 is represented by the following formula.

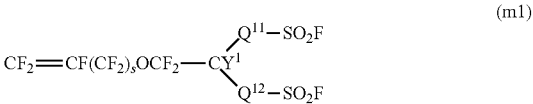

$Q^{11}$, $Q^{12}$, $Y^1$ and s are the same as $Q^{11}$, $Q^{12}$, $Y^1$ and s in the units u'1, and preferred embodiments are also the same.

The compound m1 may be produced, for example, by a known preparation method such as the method disclosed in WO2007/013533.

The compound m2 is represented by the following formula.

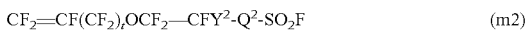

$Q^2$, $Y^2$ and t are the same as $Q^2$, $Y^2$ and t in the units u'2, and preferred embodiments are also the same.

The compound m2 may, for example, be prepared by a known preparation method such as the method disclosed in "Du Pont Inovation", Vol. 43, third issue, year 1973, p. 10, the methods in examples of U.S. Pat. No. 4,358,412, etc.

The polymerization method may, for example, be a known polymerization method such as bulk polymerization, solution polymerization, suspension polymerization or emulsion polymerization. Further, the polymerization may be carried out in liquid or supercritical carbon dioxide.

The polymerization is carried out under a condition that radicals are formed. The method to form radicals may, for example, be a method of applying radiation such as ultraviolet rays, γ-rays or electron beams, or a method of adding a radical initiator.

As a method of converting —$SO_2F$ groups of the polymer F into ion exchange groups, the method disclosed in WO2011/013578 may be mentioned. For example, to convert —$SO_2F$ groups into acid-form sulfonic acid groups (—$SO_3^-H^+$ groups), a method of bringing the —$SO_2F$ groups of the polymer F into contact with a base to hydrolyze and convert them into salt form sulfonic acid groups, and bringing the salt form sulfonic acid groups into contact with an acid to convert them into acid form thereby to obtain acid-form sulfonic acid groups.

The above described electrolyte material of the present invention comprises the polymer H having the specific proportion of CTFE units, whereby the hydrogen gas permeability is low.

Further, conventional polymers having units u2 and CTFE units hardly have a high molecular weight, and the hot water resistance is inferior, however, the electrolyte material of the present invention comprises the polymer H having the specific proportion of units u1, whereby the molecular weight is made to be high, even though the polymer H has CTFE units. That is, the compound m1 for constituting units u1 has a higher copolymerization property than the compound m2 for constituting units u2, whereby a polymer having a high molecular weight tends to be obtained. Further, the polymer H has units u1 having two ion exchange groups, whereby EW tends to be low. As described above, the electrolyte material of the present invention comprises the polymer H having a high molecular weight and a low EW, whereby the hot water resistance is excellent.

<Liquid Composition>

The liquid composition of the present invention is a composition comprising a dispersion medium having the electrolyte material of the present invention dispersed therein.

The dispersion medium is preferably one containing an organic solvent having a hydroxy group, whereby the electrolyte material of the present invention will readily be dispersed.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol. As the organic solvent having a hydroxy group, one type may be solely used, or two or more types may be used in combination.

The dispersion medium is preferably one containing water, whereby the electrolyte material of the present invention will readily be dispersed. The proportion of water is preferably from 10 to 99 mass %, more preferably from 40 to 99 mass %, per the dispersion medium. By increasing the proportion of water, the dispersibility of the electrolyte material in the dispersion medium can be improved.

The proportion of the organic solvent having a hydroxy group is preferably from 1 to 90 mass %, more preferably from 1 to 60 mass %, per the dispersion medium. The proportion of the electrolyte material is preferably from 1 to 50 mass %, more preferably from 3 to 30 mass %, per the liquid composition.

The liquid composition may be prepared in accordance with the preparation method as described in e.g. JP-B-H04-35226, JP-A-2001-504872, JP-A-2005-82749, WO2006/38928 or JP-A-2004-519296.

A specific method of preparing the liquid composition may be a method of applying shearing such as stirring to the electrolyte material in the dispersion medium under atmospheric pressure or in a sealed state in an autoclave or the like. As the case requires, shearing such as ultrasonic waves may be applied. The preparation temperature for the liquid composition is preferably from 0 to 250° C., more preferably from 20 to 150° C., whereby the mixing state of each composition would be good.

Further, in the case of applying shearing such as stirring to a mixed solution obtained by mixing the electrolyte material, an organic solvent and water to prepare the liquid composition, the shearing such as stirring may be applied to a mixed solution obtained by adding the organic solvent and water all at once to the electrolyte material, or the organic solvent and water may be added to the electrolyte material dividedly in a plurality of times, and the shearing such as stirring may be applied between the addition operations. For example, the shearing such as stirring may be applied to a mixture having a part of the organic solvent and a part of water added to the electrolyte material and then the rest of the organic solvent and water are added to the mixture, and the shearing such as stirring is applied again. Otherwise, it is also possible that the shearing such as stirring is applied after adding only the organic solvent to the electrolyte material, and only water is added, then the shearing such as stirring is applied again.

The liquid composition of the present invention is suitably used for forming a polymer electrolyte membrane in the after mentioned membrane/electrode assembly.

<Membrane/Electrode Assembly>

FIG. 1 is a cross-section illustrating an example of a membrane/electrode assembly for a polymer electrolyte fuel cell (hereinafter referred to as membrane/electrode assembly) of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

The catalyst layer 11 is a layer containing a catalyst and a proton conductive polymer.

The catalyst may be a supported catalyst having platinum or a platinum alloy supported on a carbon carrier. The carbon carrier may, for example, be a carbon black powder.

The proton conductive polymer may, for example, be the electrolyte material of the present invention or a known electrolyte material.

The catalyst layer 11 may contain a water-repellent agent with a view to increasing the effect to suppress flooding phenomenon. The water-repellent agent may, for example, be a TFE/hexafluoropropylene copolymer, a TFE/perfluoro (alkyl vinyl ether) copolymer or polytetrafluoroethylene (hereinafter referred to as "PTFE"). The water-repellent agent is preferably a fluorinated polymer soluble in a solvent, from such a viewpoint that the water repellent treatment of the catalyst layer 11 is easy. The amount of the water-repellent agent is preferably from 0.01 to 30 mass % to the catalyst layer.

The method for forming the catalyst layer 11 may, for example, be a method of applying a fluid for forming a catalyst layer on the polymer electrolyte membrane 15, the gas diffusion layer 12 or the carbon layer 16, followed by drying or a method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the electrolyte material and the catalyst dispersed in a dispersion medium. The fluid for forming a catalyst layer may be prepared, for example, by mixing a liquid composition containing the electrolyte material with a dispersion of the catalyst.

The gas diffusion layer 12 has a function to uniformly diffuse gas into the catalyst layer 11 and a function as a current collector. The gas diffusion layer 12 may, for example, be carbon paper, carbon cloth or carbon felt. The gas diffusion layer 12 is preferably subjected to water repellent treatment with e.g. PTFE.

Figure 2:
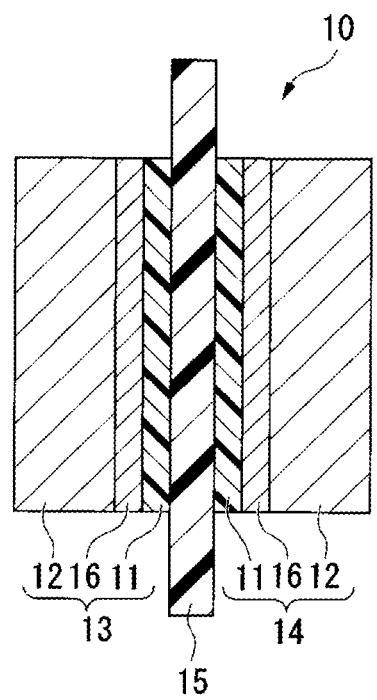
FIG. 2 is a cross-section illustrating another example of a membrane/electrode assembly of the present invention.

The membrane/electrode assembly 10 may have a carbon layer 16 between the catalyst layer 11 and the gas diffusion layer 12, as illustrated in FIG. 2. By disposing the carbon layer 16, the gas diffusion properties on the surface of the catalyst layer 11 will be improved, and the power generation characteristics of the membrane/electrode assembly 10 will be remarkably improved.

The carbon layer 16 is a layer containing carbon and a nonionic fluoropolymer.

The carbon is preferably carbon nanofibers having a fiber diameter of from 1 to 1,000 nm and a fiber length of at most 1,000 μm. The nonionic fluoropolymer may, for example, be PTFE.

The polymer electrolyte membrane 15 is a membrane containing the electrolyte material of the present invention.

The polymer electrolyte membrane 15 can be formed, for example, by a method (a casting method) wherein the liquid composition of the present invention is applied on a substrate film or the catalyst layer 11, followed by drying.

In order to stabilize the polymer electrolyte membrane 15, it is preferred to carry out heat treatment. The temperature for the heat treatment is preferably from 130 to 200° C., although it depends on the type of the electrolyte material. When the temperature for the heat treatment is at least 130° C., the electrolyte material will not excessively contain water. When the temperature for the heat treatment is at most 200° C., heat decomposition of ion exchange groups is suppressed, and a decrease in the proton conductivity of the polymer electrolyte membrane 15 is suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material for the reinforcing material may, for example, be PTFE, a TFE/hexafluoropropylene copolymer, a TFE/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and so long as it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

The membrane/electrode assembly 10 is produced, for example, by a method of forming catalyst layers 11 on a polymer electrolyte membrane 15 to form a membrane/catalyst layer assembly, and sandwiching such a membrane/catalyst layer assembly between gas diffusion layers 12 or a method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, a method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12 or a method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16, may, for example, be mentioned.

In the above described membrane/electrode assembly 10, the polymer electrolyte membrane 15 comprises the electrolyte material of the present invention, whereby the polymer electrolyte membrane has a low hydrogen permeability and is excellent in the hot water resistance.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples. Ex. 1 to 3 are Examples of the present invention, and Ex. 4 and 5 are Comparative Examples.

(Proportion of Each Units)

The proportion of each unit in the polymer F was obtained from the measurement result of $^{19}$F-NMR.

The proportion of each unit in the polymer H corresponds to each unit in the polymer F, and thereby they are omitted.

(Ion Exchange Capacity (AR))

The proportion of each unit in the polymer F was calculated as described above, the ion exchange capacity AR (milliequivalent weight/gram dried resin) of the polymer H was calculated from the proportion of each unit.

(TQ Value)

TQ (unit: ° C.) is temperature at which the extrusion amount becomes 100 mm$^3$/sec, when the polymer F is melted, and the molten polymer F is extruded from a nozzle having a length of 1 mm and an inner diameter of 1 mm, under 2.94 MPa. The extrusion amounts of the polymer F were measured at various temperatures, by using flow tester CFT-500D (manufactured by SHIMADZU CORPORATION), and the temperature at which the extrusion amount became 100 mm$^3$/sec was taken as TQ.

(Equivalent Mass (EW))

The equivalent mass EW of the polymer H was obtained from the above formula (I).

(Hydrogen Gas Permeability Coefficient)

The hydrogen gas permeability coefficient of the aftermentioned polymer electrolyte membrane 1 was measured in accordance with JIS K7126-2: 2006.

While maintaining a polymer electrolyte membrane 1 having an effective permeation area of 9.62 cm$^2$ at 80° C., hydrogen gas of which relative humidity was controlled at 10% was flown to a first surface at 30 mL/min, argon gas of which relative humidity was controlled at 10% was flown to a second surface at 30 mL/min, and the amount of hydrogen gas which penetrates into argon gas was measured by gas chromatography.

(Hot Water Resistance)

The after-mentioned polymer electrolyte membrane 2 was put in a glove box sealed with nitrogen and dried at room temperature for at least 48 hours, and then the mass (W1) was measured. The polymer electrolyte membrane 2 was put in a sealed vessel filled with 120 mL of ultrapure water, and the sealed vessel was put in an oven at 120° C. After 24 hours, the heating was terminated, the polymer electrolyte membrane 2 was taken from the sealed vessel, and moisture on a surface was wiped off with filter paper (No. 2, manufactured by ADVANTEC CO., LTD.). The polymer electrolyte membrane 2 was put in a glove box sealed with nitrogen and dried at room temperature for at least 48 hours, and then the mass (W2) was measured. The mass reduction ratio (mass %) was calculated by the following formula II.

Mass reduction ratio=$((W1-W2) \div W1) \times 100$       II (Abbreviation)

BSVE-2E: compound m1-2,
PSVE: compound m2-1,
CTFE: chlorotrifluoroethylene,
TFE: tetrafluoroethylene,
AK225G: $CCIF_2CF_2CHCIF$ (ASAHIKLIN (registered trademark of Asahi Glass Company, Limited) AK-225G),
AE3000: $CF_3CH_2OCF_2CF_2H$ (ASAHIKLIN (registered trademark of Asahi Glass Company, Limited) AE3000),
AC2000: $C_6F_{13}H$ (ASAHIKLIN (registered trademark of Asahi Glass Company, Limited) AC-2000),
V601: 2,2'-azobis(dimethyl isobutyrate), (V-601, manufactured by Wako Pure Chemical Industries, Ltd.),
PFB: bis(heptafluorobutyryl) peroxide (PFB, manufactured by NOF Corporation),
APS: ammonium peroxydisulfide

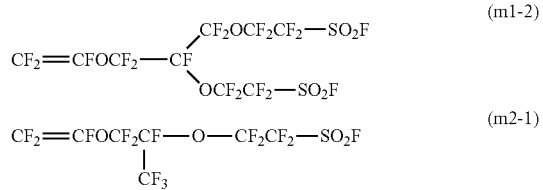

(m1-2)

$CF_2=CFOCF_2CF$ —O— $CF_2CF_2$ —$SO_2F$
　　　　　　　|
　　　　　　　$CF_3$ (m2-1)

Into a stainless steel autoclave having an internal capacity of 495 mL, 400.07 g of BSVE-2E was charged, and freezing deaeration using liquid nitrogen was carried out two times. The autoclave was left to reduced pressure, and 14.96 g of CTFE was charged. After the temperature was raised to 25° C., TFE was introduced until the pressure would be 0.295 MPaG. No change of the pressure was confirmed, and then 3.02 g of AK225G having 2.8 mass % solution of PFB dissolved was added under pressure with nitrogen gas, and a supplying line was washed with 4.02 g of AK225G. While maintaining the temperature and the pressure at constant, TFE was continuously supplied for the polymerization. After 6.5 hours from the initiation of the polymerization, the autoclave was cooled to terminate the polymerization reaction, and gas in the system was purged to obtain a solution of a polymer F-1.

The solution of the polymer F-1 was mixed with 1,100 g of AE3000 being −25° C. to agglomerate the polymer F-1 and to form particles. The filtrate containing the particles of the polymer F-1 was filtered off with a filter paper (No. 4A, manufactured by ADVANTEC CO., LTD.). 200 g of AE3000 was added to the obtained particles of the polymer F-1, followed by stirring and filtration. The obtained particles of the polymer F-1 were dried under reduced pressure overnight at 140° C. to obtain 14.1 g of the polymer F-1. TQ, AR, EW and the proportion of each unit are shown in Table 1.

The polymer F-1 was pressed by means of a pressing machine (SA-301, manufactured by TESTER SANGYO CO., LTD.) at the same temperature as TQ of the polymer F-1 to produce a membrane having a size of 30 mm×50 mm and a thickness of from 100 to 200 μm. The membrane was broken into pieces and dipped in an aqueous solution containing 20 mass % of potassium hydroxide for 16 hours to hydrolyze —$SO_2F$ groups in the polymer F-1 and convert into —$SO_3K$ groups. The polymer was dipped in a 3 mol/L hydrochloric acid aqueous solution for 2 hours. The hydrochloric acid aqueous solution was exchanged, and the same treatment was repeated 4 times to convert —$SO_3K$ groups in the polymer to sulfonic acid groups to obtain a polymer H-1. The polymer H-1 was sufficiently washed with ultrapure water.

A mixed dispersion medium of ethanol/water=50/50 (mass ratio) was added to the polymer H-1 to adjust the solid content concentration to 18 mass %, and the mixture was stirred in an autoclave at 105° C. for 8 hours to obtain a liquid composition L-1 having the polymer H-1 dispersed in the dispersion medium.

The liquid composition L-1 was applied on a surface of a sheet (AFLEX 100N (registered trademark of Asahi Glass Company, Limited), thickness: 100 μm) made of an ethylene-TFE copolymer by means of a die coater, dried at 80° C. for 30 minutes and further subjected to heat treatment at 185° C. for 30 minutes to obtain a polymer electrolyte membrane 1 having a thickness of 20 μm. The hydrogen gas permeability coefficient of the polymer electrolyte membrane 1 is shown in Table 1.

A polymer electrolyte membrane 2 having sulfonic acid groups converted from —$SO_3K$ groups was obtained in the same manner as in the above operations to obtain the polymer H-1, except that without breaking the membrane made of the polymer F-1 into pieces, the membrane was dipped in an aqueous solution containing 20 mass % of potassium hydroxide. The hot water resistance (mass reduction ratio) of the polymer electrolyte membrane 2 is shown in Table 1.

Hereinafter, the composition of each polymer and the physical properties of the obtained polymer F-2 to F-5, the polymer H-2 to H-5 and the polymer electrolyte membrane 1 and the polymer electrolyte membrane 2 and the evaluation results of each polymer electrolyte membrane are shown in Table 1 and Table 2, similarly to Example 1.

Ex. 2

Into a stainless steel autoclave having an internal capacity of 495 mL, 350.02 g of BSVE-2E was charged, and freezing deaeration using liquid nitrogen was carried out two times. The autoclave was left to reduced pressure, and 8.08 g of CTFE was charged. After the temperature was raised to 57° C., TFE was introduced until the pressure would be 0.745 MPaG. No change of the pressure was confirmed, and then 4.09 g of an AK225G solution having 76.4 mg of V601 dissolved therein was added under pressure with nitrogen gas, and a supplying line was washed with 2.48 g of AK225G. While maintaining the temperature and the pressure at constant, TFE was continuously supplied for the polymerization. After 8 hours from the initiation of the polymerization, the autoclave was cooled to terminate the polymerization reaction, and gas in the system was purged to obtain a solution of a polymer F-2.

The solution of the polymer F-2 was mixed with 1,000 g of AE3000 being −25° C. to agglomerate the polymer F-2 and to form particles in the same manner as in Ex. 1. 18.7 g of the polymer F-2 was obtained in the same manner as in Ex. 1, except that 250 g of AE 3000 was added to the obtained particles of the polymer F-2.

A polymer electrolyte membrane 1 and a polymer electrolyte membrane 2 were obtained in the same manner as in Ex. 1.

Ex. 3

Into a stainless steel autoclave having an internal capacity of 1,006 mL, 880.12 g of BSVE-2E was charged, and freezing deaeration using liquid nitrogen was carried out two times. The autoclave was left to reduced pressure, and 54.9 g of CTFE was charged. After the temperature was raised to 25° C., TFE was introduced until the pressure would be 0.185 MPaG. No change of the pressure was confirmed, and then 5.86 g of an AK225G solution having a 2.8 mass % solution of PFB dissolved was added under pressure with nitrogen gas, and a supplying line was washed with 4 g of AK225G. While maintaining the temperature and the pressure at constant, TFE was continuously supplied for the polymerization. After 11 hours from the initiation of the polymerization, the autoclave was cooled to terminate the polymerization reaction, and gas in the system was purged to obtain a solution of a polymer F-3.

The solution of the polymer F-3 was mixed with 2.00 g of AE3000 being −25° C. to agglomerate the polymer F-3 and to form particles in the same manner as in Ex. 1. 17.2 g of the polymer F-3 was obtained in the same manner as in Ex. 1, except that 220 g of AE 3000 was added to the obtained particles of the polymer F-3.

A polymer electrolyte membrane 1 and a polymer electrolyte membrane 2 were obtained in the same manner as in Ex. 1.

Ex. 4

Into a stainless steel autoclave having an internal capacity of 230 mL, 61.08 g of BSVE-2E and 96.64 g of PSVE were charged, and freezing deaeration using liquid nitrogen was carried out two times. After the temperature was raised to 65° C., TFE was introduced until the pressure would be 1.02 MPaG. No change of the pressure was confirmed, and then 4.07 g of an AC2000 solution having 16.2 mg of V601 dissolved was added under pressure with nitrogen gas. While maintaining the temperature and the pressure at constant, TFE was continuously supplied for the polymerization. After 8.5 hours from the initiation of the polymerization, the autoclave was cooled to terminate the polymerization reaction, and gas in the system was purged to obtain a solution of a polymer F-4.

The solution of the polymer F-4 was diluted with 120 g of AC2000 and mixed with 325 g of AE3000 being room temperature to agglomerate the polymer F-4 and to form particles of the polymer F-4 in the same manner as in Ex. 1. 24.3 g of the polymer F-4 was obtained in the same manner as in Ex. 1, except that 215 g of AE3000 was added to the obtained particles of the polymer F-4.

A polymer electrolyte membrane 1 and a polymer electrolyte membrane 2 were obtained in the same manner as in Ex. 1.

Ex. 5

72.04 g of PSVE, 4.81 g of $C_8F_{17}COONH_4$ as an emulsifier and 240.04 g of ultrapure water were mixed, and the mixture was let to pass through a high press homogenizer (APV 2000, manufactured by SMT corporation) under pressure of 2,000 bar 10 times to obtain an emulsion. 280.5 g of the emulsion and 562 mg of APS were charged into a stainless steel autoclave having a capacity of 495 mL. After the temperature was raised to 25° C., CTFE was introduced until the pressure would be 0.06 MPaG. A liquid prepared by dissolving 56.5 mg of $Na_2S_2O_4$ in 1 g of water as a reducing agent was added under pressure with nitrogen gas, and then a supplying line was washed with 1 of ultrapure water. After 3.5 hours passed, 56.5 mg of $Na_2S_2O_4$ was similarly added. After 7 hours from the initiation of the polymerization, the autoclave was cooled to terminate the polymerization reaction, and gas in the system was purged to obtain a latex of a polymer F-5. 392 g of methanol, 145 g of AE3000 and 10 ml of hydrochloric acid were added to the latex to settle the polymer F-5, and the polymer F-5 was recovered by decantation.

The recovered polymer F-5 was vacuum dried overnight at 80° C. to obtain 4.6 g of the polymer F-5.

A polymer electrolyte membrane 1 and a polymer electrolyte membrane 2 were obtained in the same manner as in Ex. 1.

TABLE 1

| | | | Ex. 1 | Ex. 2 | Ex. 3 |
|---|---|---|---|---|---|
| Type of polymer (F) | | | F-1 | F-2 | F-3 |
| Type of polymer (H) | | | H-1 | H-2 | H-3 |
| Structural units | BSVE-2E | mol % | 16.8 | 20.5 | 17.2 |
| | PSVE | mol % | — | — | — |
| | CTFE | mol % | 38.1 | 9.6 | 53.6 |
| | TFE | mol % | 45.1 | 69.9 | 29.2 |
| TQ | | ° C. | 253 | 234 | 255 |
| AR | | meq/g | 1.73 | 1.96 | 1.73 |
| EW | | g/eq | 579 | 511 | 579 |
| Hydrogen gas permeability coefficient | | $m^3 \cdot m/(m^2 \cdot s \cdot Pa)$ | $6.1 \times 10^{-10}$ | $6.0 \times 10^{-10}$ | $5.3 \times 10^{-10}$ |
| Hot water resistance | | % | 1.5 | 4.3 | 3 |

TABLE 2

| | | | Ex. 4 | Ex. 5 |
|---|---|---|---|---|
| Type of polymer (F) | | | F-4 | F-5 |
| Type of polymer (H) | | | H-4 | H-5 |
| Structural units | BSVE-2E | mol % | 6.3 | — |
| | PSVE | mol % | 14.0 | 20.3 |
| | CTFE | mol % | — | 79.7 |
| | TFE | mol % | 79.7 | — |
| TQ | | ° C. | 227 | 254 |
| AR | | meq/g | 1.47 | 1.11 |
| EW | | g/eq | 682 | 903 |
| Hydrogen gas permeability coefficient | | $m^3 \cdot m/(m^2 \cdot s \cdot Pa)$ | $7.9 \times 10^{-10}$ | $4.5 \times 10^{-10}$ |
| Hot water resistance | | % | 1 | 23 |

The polymers F in Examples 1 to 3 have a high TQ, namely a high molecular weight, and the polymers H have a low EW. Thus, electrolyte materials obtained from them have good hot water resistance. Further, the polymers H in Examples 1 to 3 have CTFE units, whereby the hydrogen gas permeability coefficient of the electrolyte materials are sufficiently low.

The polymer F in Example 4 has no CTFE unit. Thus, an electrolyte material obtained from the polymer F in Example 4 has a relatively high hydrogen gas permeability coefficient.

The polymer H in Example 5 has no unit u1 and thereby has a high EW. Thus, an electrolyte material obtained from the polymer H in Example 5 has poor hot water resistance.

(Evaluation of Membrane/Electrode Assembly)

—SO$_2$F groups in the polymer F-3 obtained in Example 3 were converted to sulfonic acid groups to obtain a polymer H-3 in the same manner as in Example 1. The polymer H-3 was dispersed in a mixed dispersion medium of ethanol/water=50/50 (mass ratio) to obtain a liquid composition L-3 having a solid content concentration of 18 mass %. The liquid composition L-3 was applied on a surface of a sheet (AFLEX (registered trademark of Asahi Glass Company, Limited) 100N, thickness: 100 μm) made of an ethylene-TFE copolymer by a die coater, followed by drying at 80° C. for 30 minutes and further subjecting to heat treatment at 185° C. for 30 minutes to obtain a polymer electrolyte membrane having a thickness of 20 μm.

—SO$_2$F groups in a PSVE-TEF copolymer (AR: 1.1 milliequivalent/g) were converted to sulfonic acid groups in the same manner as in Example 1 to obtain a polymer H-6, except that the aqueous solution containing 20 mass % of potassium hydroxide was changed to an aqueous solution containing 30 mass % of dimethyl sulfoxide and 15 mass % of potassium hydroxide. The polymer H-6 was dispersed in a mixed dispersion medium of ethanol/water=60/40 (mass ratio) to obtain a liquid composition L-6 having a solid content concentration of 10 mass %. 126 g of water was added to 20 g of an catalyst having 50 mass % of platinum supported on a carbon powder, followed by irradiation with ultrasonic waves for 10 minutes to uniformly disperse the catalyst. 80 g of the liquid composition L-6 was added thereto, and 54 g of ethanol was further added to adjust the solid content concentration to 10 mass % to obtain a coating liquid for forming a catalyst layer. The coating liquid was applied on a surface of a sheet made of an ethylene-ETFE copolymer and dried to form two sheets of a catalyst layer having an amount of platinum of 0.2 mg/cm$^2$.

The sheet made of the ethylene-ETFE copolymer was peeled from the polymer electrolyte membrane, then the polymer electrolyte membrane was sandwiched between the two catalyst layers, followed by hot pressing at a temperature of 150° C. for 5 minutes under a pressure of 3 MPa to bond the catalyst layers on both sides of the polymer electrolyte membrane, and the sheet made of the ethylene-ETFE copolymer was peeled from the catalyst layers to obtain a membrane/catalyst layer assembly having an electrode area of 25 cm$^2$. The membrane/catalyst layer assembly was sandwiched between two gas diffusion layers made of carbon paper to obtain a membrane/electrode assembly. The carbon paper had a layer comprising carbon and PTFE on one surface and arranged so that the layer comprising carbon and PTFE would be in contact with the catalyst layer of the membrane/catalyst layer assembly.

The membrane/electrode assembly was assembled into a cell for power generation, and hydrogen (utilization ratio: 70%) was supplied to an anode, and air (utilization ratio: 50%) was supplied to a cathode, at a cell temperature of 120° C. under a pressure of 100 kPaG respectively. When both the gas humidity dew points of hydrogen and air were 98° C., and the current density was 0.2 A/cm$^2$, the cell voltage was 0.72 V.

INDUSTRIAL APPLICABILITY

The electrolyte material of the present invention is useful for a polymer electrolyte membrane, etc. in a membrane/electrode assembly for a polymer electrolyte fuel cell.

This application is a continuation of PCT Application No. PCT/JP2017/024690, filed on Jul. 5, 2017, which is based upon and claims the benefit of priority from Japanese Patent Application No. 2016-137026 filed on Jul. 11, 2016. The contents of those applications are incorporated herein by reference in their entireties.

REFERENCE SYMBOLS

10: Membrane/electrode assembly, 11: catalyst layer, 12: gas diffusion layer, 13: anode, 14: cathode, 15: polymer electrolyte membrane, 16: carbon layer

What is claimed is:

1. An electrolyte material comprising a polymer H having units represented by the following formula (u1) and units based on chlorotrifluoroethylene, wherein the proportion of the units represented by the formula u1 is from 10 to 25 mol % per all units contained in the polymer H, and the proportion of the units based on chlorotrifluoroethylene is from 38.1 to 90 mol % per all units contained in the polymer H:

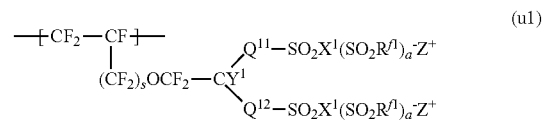

wherein $Q^{11}$ is a perfluoroalkylene group which may have an etheric oxygen atom, $Q^{12}$ is a single bond or a perfluoroalkylene group which may have an etheric oxygen atom, $Y^1$ is a fluorine atom or a monovalent perfluoroorganic group, s is 0 or 1, $R^{f1}$ is a perfluoroalkyl group which may have an etheric oxygen atom, $X^1$ is an oxygen atom, a nitrogen atom or a carbon atom, a is 0 when $X^1$ is an oxygen atom, a is 1 when $X^1$ is a nitrogen atom, a is 2 when $X^1$ is a carbon atom, and $Z^+$ is $H^+$, a monovalent metal ion or an ammonium ion of which at least one hydrogen atom ay be substituted with a hydrocarbon group.

2. The electrolyte material according to claim 1, wherein the polymer H has at most 800 g/equivalent of EW represented by the following formula:

$$EW=1000/AR \qquad (I)$$

wherein EW is equivalent mass which represents the mass of a polymer per one equivalent amount of an ion exchange group, and AR is ion exchange capacity which represents milliequivalent amount of ion exchange groups per 1 g of the polymer.

3. The electrolyte material according to claim 1, wherein the polymer H further has units based on tetrafluoroethylene.

4. The electrolyte material according to claim wherein the polymer H comprises the units represented by the formula (u1)/ the units based on chlorotrifluoroethylene/ the units based on tetrafluoroethylene at the proportion of 10 to 25 mol %/ 38.1 to 90 mol %/ 0 to 85 mol %, per all units contained in the polymer H.

5. The electrolyte material according to claim 1, wherein the units represented by the formula u1 is units represented by the following formula u1-1, the formula u1-2 or u1-3:

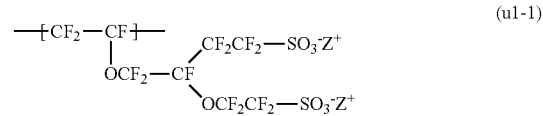

-continued

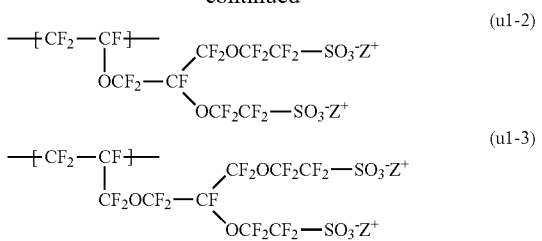

wherein $Z^+$ is $H^+$, a monovalent metal ion or an ammonium ion of which at least one hydrogen atom may be substituted with a hydrocarbon group.

6. The electrolyte material according to claim 1, wherein the polymer H further has units represented by the following formula u2:

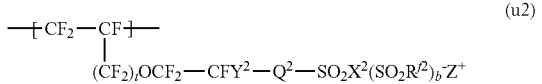

wherein $Q^2$ is a single bond or a perfluoroalkylene group which may have an etheric oxygen atom, $Y^2$ is a fluorine atom or a monovalent perfluoroorganic group, t is 0 or 1, $R^{f2}$ is a perfluoroalkyl group which may have an etheric oxygen atom, $X^2$ is an oxygen atom, a nitrogen atom or a carbon atom, b is 0 when $X^2$ is an oxygen atom, b is 1 when $X^2$ is a nitrogen atom, b is 2 when $X^2$ is a carbon atom, and $Z^+$ is $H^+$, a monovalent metal ion or an ammonium ion of which at least one hydrogen atom may be substituted with a hydrocarbon group.

7. The electrolyte material according to claim 1, wherein the mass reduction rate when dipped in hot water at 120° C. for 24 hours is at most 15 mass %.

8. The electrolyte material according to claim 1, wherein the hydrogen gas permeability coefficient at a temperature of 80° C. under a relative humidity of 10% is at most $6.7 \times 10^{-1}$ $m^3 \cdot m/(m^2 \cdot s \cdot Pa)$.

9. A polymer electrolyte membrane comprising the electrolyte material as defined in claim 1.

10. A membrane/electrode assembly comprising an anode having a catalyst layer, a cathode having a catalyst layer and the polymer electrolyte membrane as defined in claim 9 which is disposed between the anode and the cathode.

11. A polymer electrolyte fuel cell comprising the membrane/electrode assembly as defined in claim 10.

* * * * *